United States Patent
Knoblauch et al.

(10) Patent No.: US 7,419,456 B2
(45) Date of Patent: Sep. 2, 2008

(54) DEVICE FOR INCREASING THE FUNCTIONAL RELIABILITY OF A HYDRAULIC CIRCUIT OF A HYDRAULICALLY OPERABLE CLUTCH

(75) Inventors: Thomas Knoblauch, Saarbrücken (DE);
Christoph Rüchardt, Bodolz (DE);
Otto Ebner, Friedrichshafen (DE);
Klaus Schweiger, Friedrichshafen (DE);
Matthias Winkel, Weingarten (DE);
Andreas Schwenger, Wolfsburg/Reislingen (DE); Marcus Gansohr, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 475 days.

(21) Appl. No.: 10/536,381

(22) PCT Filed: Nov. 26, 2003

(86) PCT No.: PCT/EP03/13271

§ 371 (c)(1),
(2), (4) Date: Jul. 27, 2005

(87) PCT Pub. No.: WO2004/051109

PCT Pub. Date: Jun. 17, 2004

(65) Prior Publication Data

US 2006/0116237 A1    Jun. 1, 2006

(30) Foreign Application Priority Data

Nov. 29, 2002  (DE) ................. 102 55 713

(51) Int. Cl.
*B60W 10/02*  (2006.01)
*B60W 10/04*  (2006.01)
*F16D 13/75*  (2006.01)
*F16D 25/08*  (2006.01)
*F16D 25/12*  (2006.01)

(52) U.S. Cl. ............. 477/174; 192/111.12; 192/70.251; 192/91 R; 192/85 C

(58) Field of Classification Search ....................... None
See application file for complete search history.

(56) References Cited

U.S. PATENT DOCUMENTS 3,424,278 A    1/1969  Ostwald et al.
3,812,942 A    5/1974  Espenschied et al.

(Continued)

FOREIGN PATENT DOCUMENTS

DE        1 600 130        1/1970

(Continued)

*Primary Examiner*—Richard M. Lorence
*Assistant Examiner*—Edwin A. Young
(74) *Attorney, Agent, or Firm*—Davis Bujold & Daniels, P.L.L.C.

(57) ABSTRACT

A known device for increasing the functional reliability for a hydraulic circuit of a hydraulic clutch having a pressure reservoir (25) and a release cylinder (5) which comprises a primary piston (14) and a secondary piston (16). A compensation volume is developed in the sense that when the vehicle is at a standstill and the parking brake released, an unintentional release of the clutch is prevented. A pressure-monitoring/pressure-supply device (28) is used for determining a reference operating pressure and establishes a static pressure which, in case of any system error, only allows displacement of the secondary piston (16) such that the contact pressure of the clutch discs, against one another, is still sufficient to maintain the vehicle at a standstill.

9 Claims, 3 Drawing Sheets

U.S. PATENT DOCUMENTS

| | | | |
|---|---|---|---|
| 5,009,299 A | 4/1991 | Seegers | |
| 5,042,631 A | 8/1991 | Ellenberger et al. | |
| 5,060,776 A * | 10/1991 | Skog et al. | 192/85 R |
| 5,769,752 A | 6/1998 | Kim | |
| 5,847,272 A | 12/1998 | Schneider et al. | |
| 6,298,969 B1 | 10/2001 | Nagler et al. | |
| RE37,572 E | 3/2002 | Kremmling et al. | |

FOREIGN PATENT DOCUMENTS

| | | |
|---|---|---|
| DE | 44 26 260 A1 | 2/1995 |
| DE | 195 00 540 A1 | 7/1996 |
| DE | 196 53 203 A1 | 7/1997 |
| DE | 197 17 486 A1 | 10/1998 |
| DE | 199 45 806 A1 | 5/2000 |
| DE | 199 10 573 A1 | 9/2000 |
| DE | 102 36 881 A1 | 2/2003 |
| DE | 102 31 786 A1 | 5/2003 |
| EP | 0 386 330 A1 | 9/1990 |
| EP | 0 984 185 A2 | 3/2000 |
| GB | 936475 | 9/1963 |
| GB | 2 295 435 A | 5/1996 |
| WO | WO-89/10494 | 11/1989 |

* cited by examiner

DEVICE FOR INCREASING THE FUNCTIONAL RELIABILITY OF A HYDRAULIC CIRCUIT OF A HYDRAULICALLY OPERABLE CLUTCH

This application is a national stage completion of PCT/EP2003/013271 filed Nov. 26, 2003 which claims priority from German Application Serial No. 102 55 713.6 filed Nov. 29, 2002.

FIELD OF THE INVENTION

The invention concerns a device for increasing the functional reliability for a hydraulic circuit of a hydraulically operable clutch.

BACKGROUND OF THE INVENTION

An increase of the functional reliability of the hydraulic circuit of a hydraulically operable clutch generally aims at maintaining the existing shifting state of the clutch and obtaining between the shifting states a defined transition characteristic which can be reproduced and thus effectively controlled by the driver of the vehicle concerned.

To meet the requirements, pressure intensifiers are known from the prior art from which a sufficient feedback goes to the clutch pedal so that the engagement and disengagement ratios sought by the driver can be adapted to the existing situation. It is very important here to implement play and wear compensation in order to ensure a coincident response characteristic during the service life of the clutch.

Release cylinders thus are known from the prior art in which automatic wear compensation is implemented. In that case, the release cylinder can have two pistons; the axial spacing between which is determined by the volume of a liquid located between the pistons; there resulting an adaptation of the volume depending on the wear state of the clutch.

However, when the vehicle is stopped, there is the danger that in case the working valve is not sealed, hydraulic liquid flows into the intermediate space between primary and secondary pistons, via a bleeding hole and, due to the volume increase, moves the secondary piston so that a slow opening of the clutch cannot be ruled out with certainty whereby the vehicle, when the parking brake is open, could unintentionally set itself in motion.

In DE 197 17 486 C2 is described a pneumatic pressure intensifier for a hydraulic clutch operation for motor vehicles. In the pressure intensifier, a pneumatic working space is provided which can be loaded with pressurized air for pressure intensification of a hydraulic working space. One control piston, coordinated with the pneumatic working space and serving for engaging and disengaging the pressure intensification source, is activated by a working piston located in the hydraulic circuit so that a leakage, due to pressure increase in the release cylinder, does not occur.

However, the described pneumatic intensifier of the device has a complicated construction and, to that extent, is susceptible to noise and comparatively costly to produce.

Therefore, the invention is based on the problem of increasing the functional reliability of an operation in the hydraulic circuit of hydraulic clutch by comparatively simple means.

SUMMARY OF THE INVENTION

One pressure-monitoring/pressure-supply device is coordinated with the pressure reservoir which determines a reference operating pressure and a differential pressure so as to reduce the operating pressure when the vehicle is stationary and the engine is disconnected for obtaining a residual static pressure.

The invention is associated with the advantage that when the vehicle is started again after stoppage with disconnected motor, as a result of the steadily provided static pressure the hydraulic clutch, is quickly available and, at the same time, the stress of the pressure reservoir is reduced since it is not exposed to the full operating pressure. The permanently abutting full operating pressure can lead to an intensified diffusion of the operating medium, particularly when the pressure reservoir is designed as a diaphragm reservoir. The consequence would be increased operating and maintenance costs. It is further ensured that when static pressure abuts, the clutch does not open or can open only to the extent that a sufficiently high drag torque is retained on the clutch so that the vehicle does not roll away.

In a preferred development of the invention, the inventive device has one pressure-limiting unit which makes an adjustment and limitation of the static pressure possible based on a maximum value which, when action is exerted upon the liquid volume located between primary and secondary pistons, allows only a displacement of the secondary piston of the release cylinder such that the contact pressure of the clutch pressure plate on the clutch disc still suffices to keep the vehicle at a standstill. It is thus ensured that when a gear is introduced and the parking brake released, even on an inclined road, the vehicle is held in the position concerned.

To determine the maximum admissible static pressure, it is possible to use the relative displacement of the piston rod that actuates the release lever of the clutch. The piston rod can thus remain in operative connection with an incremental travel measuring system from which the information, concerning the covered path of the piston rod, can be relayed as standard to the pressure-monitoring/pressure-supply device for establishing the functional dependence of the static pressure on the axial displacement of the piston rod.

In addition, it is basically possible to detect the distortion characteristics of the piston spring and set it in relation to the momentarily prevalent pressure.

To prevent the selected static pressure from lowering, due to inner leakages in the hydraulic circuit which would result in delaying the availability of the vehicle after a period of time without operation, in a convenient development of the invention, one trigger element is coordinated with the pressure-monitoring/pressure-supply device which, preferably timed, causes a revision of the static pressure. The static pressure is conveniently corrected when a reference pressure, deemed admissible, is fallen below. For the triggering, the appertaining electronic system always has to be activated only briefly, e.g., once per hour which as a consequence, will have only an unimportant consumption of energy. Should the pressure fall below the preset value determined, then the pump, or any other such device for producing the operating pressure, has to be operated until the required operating pressure is again produced. For the driver, corresponding information can be provided in case the leakage rate in the hydraulic system shows a significant error in the system which can be detected when, in the course of time, the pressure drop exceeds a specific value.

Should the possibility be ruled out that under action of the static pressure upon the release cylinder there generates a volume increase between primary and secondary pistons and thus a force action upon the release lever of the clutch which leads to a reduction of the transmissible torque and to a partial opening of the clutch then, in development of the invention, by way of control of a working valve, the primary piston can be displaced to the extent of shutting a bleeding hole communicating with the compensation volume. Due to the volume increase in the intermediate space, there also exists the danger that when a clutch is actuated, the diaphragm spring between the two pistons could be over-pressed and destroyed and that the clutch no longer closes again or closes with great delay.

When the clutch is closed, the primary piston of the release cylinder is positioned so that the bleeding hole of the primary piston is shut in order that no change of volume affects the liquid volume located between primary and secondary pistons.

To allow a wear compensation of the piston, the pressure control unit is briefly deactivated by a trigger switch in a preferred development of the invention so that the primary piston of the release cylinder, for a volume compensation, releases the bleeding hole to the space between the primary and the secondary pistons. The triggering ensures that an opening of the bleeding hole has not to occur upon each actuation of the clutch, but only on and off, and yet a sufficient wear compensation results and the above described danger is prevented. A triggered travel recording of the piston can ensure that the vehicle does not roll away. An adjustment of the clutch would be detected and the static pressure adapted.

BRIEF DESCRIPTION OF THE DRAWINGS

The invention will now be described, by way of example, with reference to the accompanying drawings in which.

DETAILED DESCRIPTION OF THE INVENTION

Figure 1:
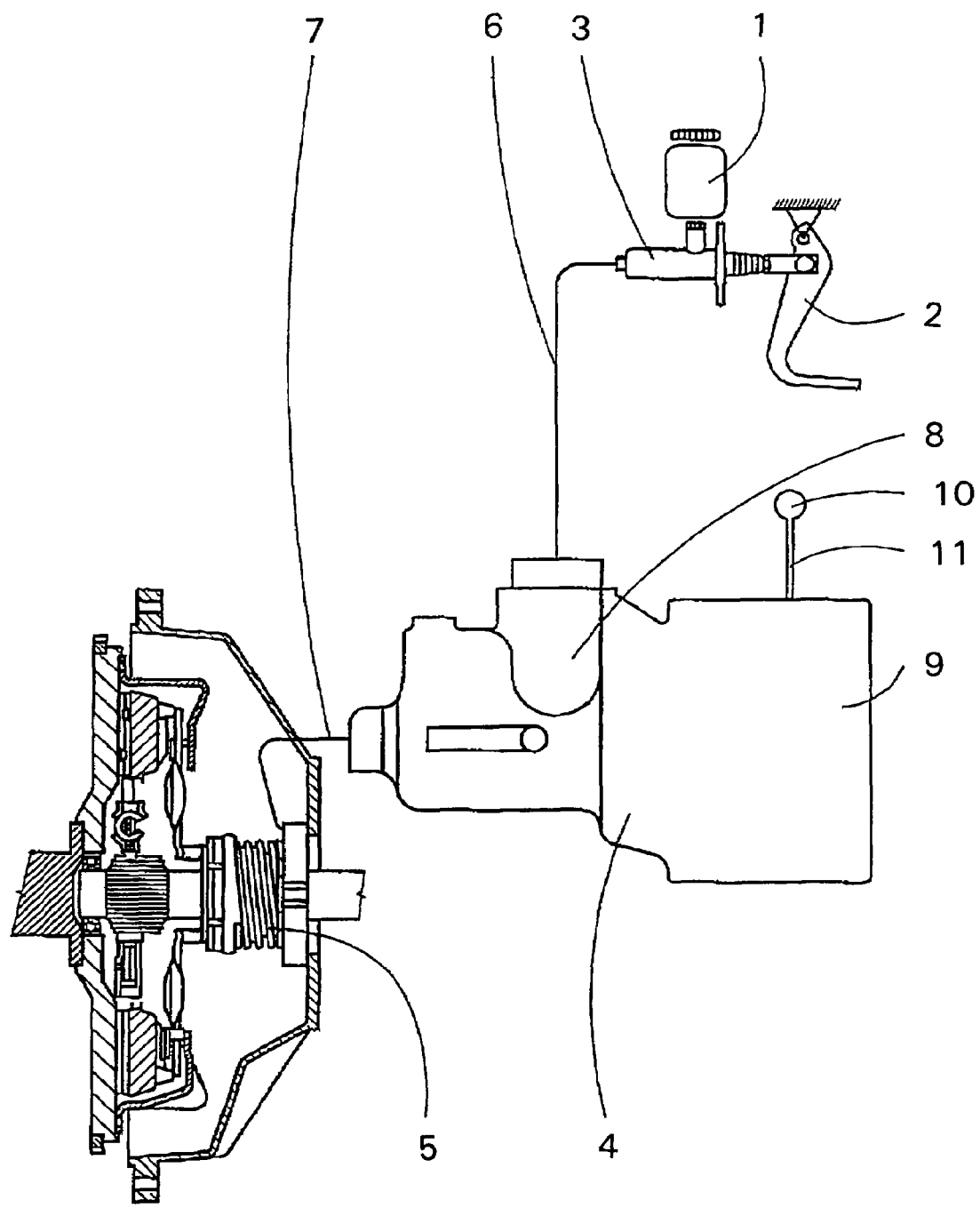
FIG. 1 is the basic construction of a hydraulic clutch actuation deice with a pneumatic intensifier.

A hydraulic clutch actuation device with pneumatic intensifier essentially consists, according to FIG. 1, of a master cylinder 3 provided with a compensation tank 1 and actuated by a clutch pedal 2, one pressure intensifier 4 rear-mounted on the master cylinder, one release cylinder 5 acting upon the release mechanism of the clutch and hydraulic pipes 6 and 7 which create an impermeable connection between the master cylinder 3 and the pressure intensifier 4, the same as between the pressure intensifier 4 and the release cylinder 5.

The pressure intensifier 4 has one pneumatic area 9 which acts upon hydraulic area 8 and the adjoining hydraulic pipes 6, 7 and in an active state is loaded with a compressed gas provided by a compressor 10 via a pneumatic line 11.

Figure 2:
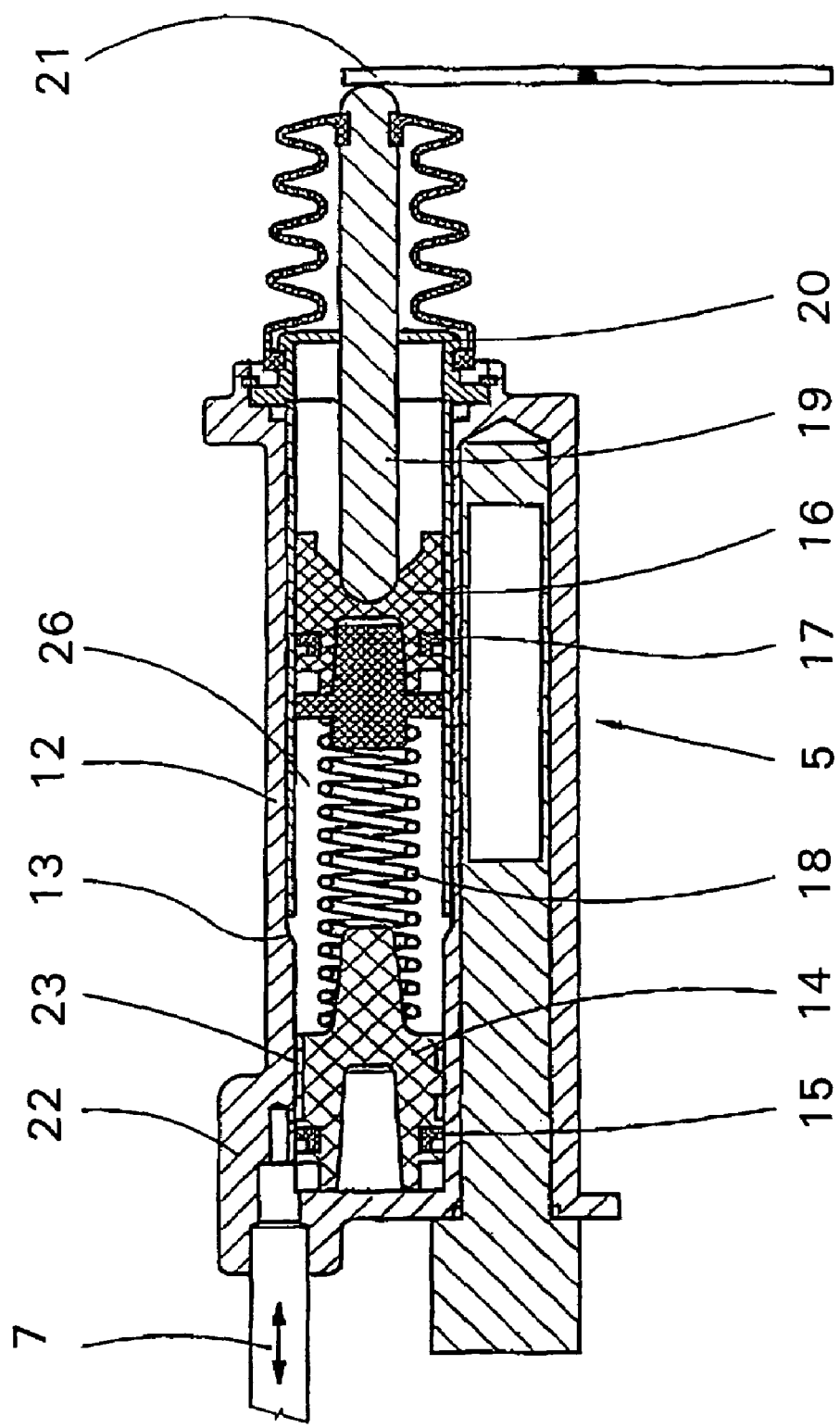
FIG. 2 is a release cylinder of a clutch actuation according to FIG. 1 with primary and secondary pistons.

In FIG. 2, the release cylinder 5 is not shown in a controlled state. A housing 12, basically designed of cylindrical shape, is provided with a stepped hole 13 one primary piston 14 with a seal ring 15 and one secondary piston 16 with a seal ring 17 are axially movably disposed. A spacing between the primary piston 14 and the secondary piston 16 and thus the practical possibility of creating a free space for an automatic wear compensation of parts of the clutch is achieved by a spiral spring 18 which limits the approximation of the secondary piston 16 to the primary piston 14 in case of pressure relief of the primary piston 14. The secondary piston 16 acts upon a piston rod 19 which is passed into a recess of a front plate 20 of a release cylinder 5 and extends to the release lever 21 of the clutch actuation. For protection, the piston rod 19 is surrounded by bellows which by their terminal area sit upon the front plate 20 of the housing 12.

On the end of the housing 12 remote from the piston rod 19, the hydraulic pipe 7 is impermeably connected with a connecting area 22 of the housing 12. One bleeding hole 23 provided in the connecting area 22 produces in the terminal side stop of the primary piston 14 a connection of the hydraulic pipe 7 with a compensation space 26 between the primary piston 14 and the secondary piston 16 so that the liquid in the compensation space 26 between the primary piston 14 and the secondary piston 16 communicates with the liquid provided via the hydraulic pipe 7. The space between the piston 14 and 16 can be altered by altering the liquid volume enclosed between the primary piston 14 and the secondary piston 16, thus achieving a wear compensation in the area of the clutch.

Figure 3:
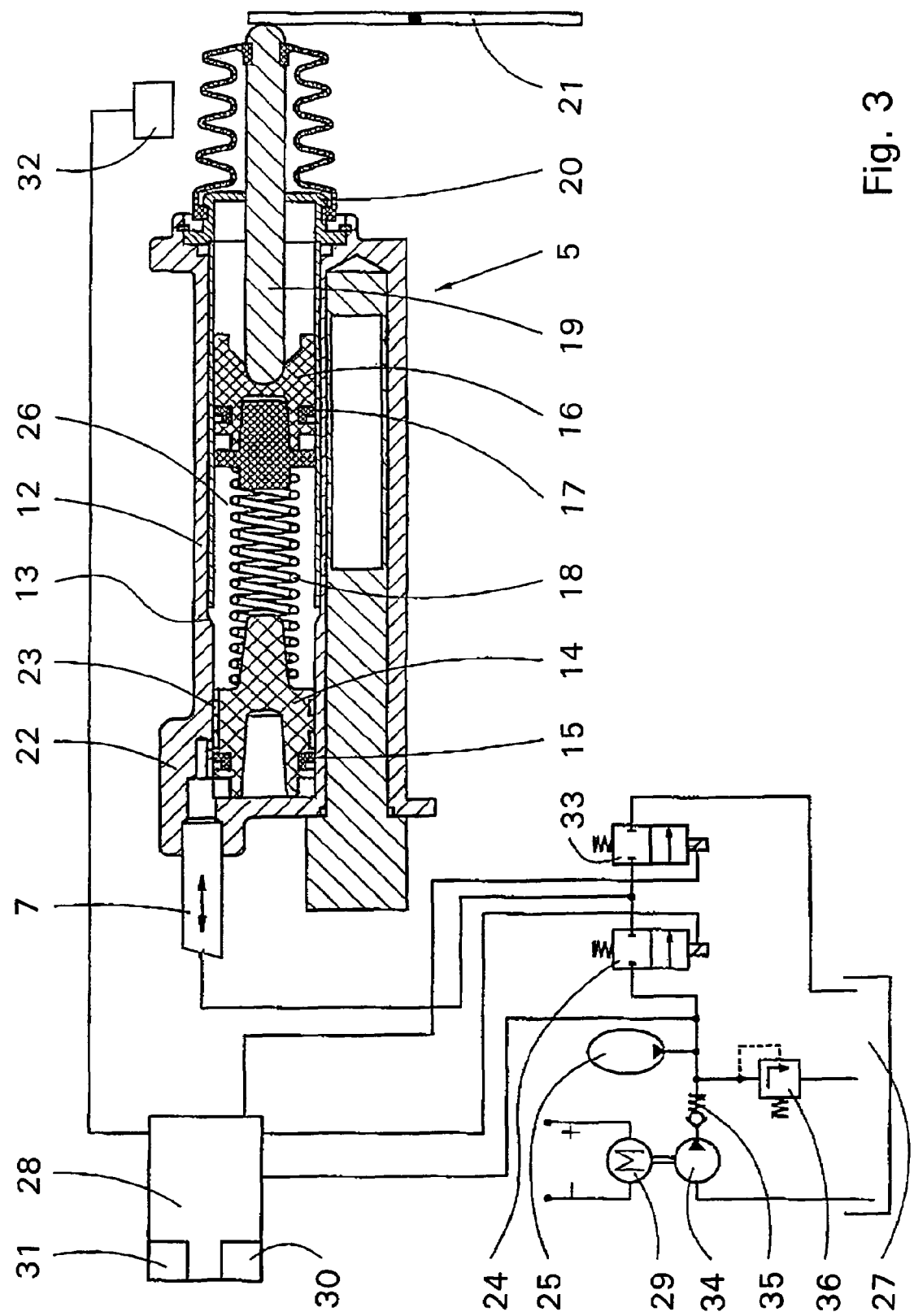
FIG. 3 is a graph of the release cylinder with symbolic tying of a pressure-monitoring/pressure-supply device and one pressure control unit.

As shown in FIG. 3, the release cylinder 5 of the hydraulic clutch actuation is controlled by a working valve 24 designed as 2/2 directional seat valve which, in one of its shifting states, relays the hydraulic system pressure originating from a pressure reservoir 25 to the connecting area 22 of the release cylinder 5 after the primary piston 14 is axially displaced from its end position and shuts the bleeding hole 23. By way of the liquid of constant volume in the compensation space 26 between primary piston 14 and second piston 16 there result the movement of the primary piston 14, the same as of the secondary piston 16 and also the piston rod 19 whereby the release lever 21 is actuated and the clutch opened.

One pump 34 driven by a motor 29 conveys hydraulic liquid from a tank 27, via a recoil valve 35, in direction toward the pressure reservoir 25. In order that the pressure is monitored in the system, a pressure-limiting valve 36 is provided which allows hydraulic liquid to flow back to the tank 27 should it be necessary.

When the clutch closes, the spring-loaded release lever 21 moves back to its original position in FIG. 3 and, at the same time, produces an axial movement to the left of the secondary piston 16 of the enclosed hydraulic liquid and primary piston 14 until the latter has reached its final position in the housing 12 of the release cylinder 5. A working valve 33, designed as 2/2 directional seat valve, is in a shifting position here in which a volume return flow can result in the tank 27. Adapted shifting positions of the working valves 24 and 33 additionally allow an oil volume compensation in an end position of the primary piston 14, via the bleeding hole 23, released by the primary piston 14 and thus an adaptation of the clutch actuation to the wear characteristics of the of the clutch.

If the vehicle is stopped and the motor is shut off, a pressure-monitoring/pressure-supply device 28 receives a corresponding information on the basis of which the monitoring/pressure-supply device 28 determining the system pressure and reducing it by a differential pressure so that when gear has been introduced and parking brake is open, the vehicle is prevented from rolling away even on inclined roads and a quick availability of the clutch actuation is nevertheless ensured from then on.

For this the pressure-monitoring/pressure-supply device 28 ensures that the pressure detected in the pressure-monitoring/pressure-supply device 28 from system and differential pressure is limited to a static pressure which, during action upon the secondary piston 16 and thus upon piston rod 19 and release lever 21, cannot lead to a partial release of the clutch. Such can always be the case when, due to error in the system, for example, when the working valve 24 does not exactly close, a slow pressure buildup occurs on the release cylinder 5 which, when the bleeding hole 23 is open, would result in a volume increase of the liquid-filled compensation space 26 between primary piston 14 and secondary piston 16.

Therefore, by adequate minimal control of a shifting element, such as the working valve 24, by way of a pressure control unit 30 provided in the pressure-monitoring/pressure-supply device 28, due to the pressure generating on the release cylinder 5, the primary piston 14 is displaced in a direction of the "clutch open" state and thereby the bleeding hole 23 is kept closed while the clutch remains closed. Alternatively, the primary piston 14 in the "clutch closed" state could always be moved forward to the extent that the bleeding hole 23 is shut. Then, only after a clutch actuation, the primary piston 14 is briefly moved back up to the stop and the bleeding hole 23 opened in order to be subsequently brought again to the position in which the bleeding hole 23 is closed. Since the clutch wear per clutch operation is small, this method suffices to make a reliable wear compensation possible and shut the bleeding hole 23 when its operation is not needed. Thus an uncontrolled oil flow in the intermediate space between primary and secondary pistons 14, 16 is reliably prevented.

As one other alternative, the volume change between the primary piston 14 and the secondary piston 16 and therewith a wear compensation of the clutch can also result by a trigger switch 31 which, likewise, can also be situated in the pressure-monitoring/pressure-supply device 28 and, at certain intervals, briefly deactivates the shutting of the bleeding hole 23 by the primary piston 14 to enable a volume exchange to take place.

Besides, the pressure-monitoring/pressure-supply device 28 communicates with an incremental path sensor 32 by which the information relative to the covered path of the piston rod 19 is relayed as standard to the pressure-monitoring/pressure-supply device 28 for establishing the functional dependence of the static pressure on the axial displacement of the piston rod 19.

The pressure control unit 30 can be designed so as to work independently of the pressure-monitoring/pressure-supply device 28, thus being active when the clutch is closed under different operation conditions and also when the motor is active.

REFERENCE NUMERALS

1 compensation tank
2 clutch pedal
3 master cylinder
4 pressure intensifier
5 release cylinder
6 hydraulic pipe
7 hydraulic pipe
8 hydraulic area
9 pneumatic area
10 compressor
11 pneumatic pipe
12 housing
13 stepped hole
14 primary piston
15 seal ring
16 secondary piston
17 seal ring
18 spiral spring
19 piston rod
20 front plate
21 release lever
22 connecting area
23 bleeding hole
24 working valve
25 pressure reservoir
26 compensation space
27 tank
28 pressure-monitoring/pressure-supply device
29 motor
30 pressure control unit
31 trigger switch
32 path sensor
33 working valve
34 pump
35 recoil valve
36 pressure-limiting valve

The invention claimed is:

1. A hydraulically clutch actuation device in a vehicle for increasing a functional reliability for a hydraulic circuit of a hydraulically actuatable clutch having a release cylinder (5) actuated by a master cylinder (3) via hydraulic pipes (6, 7), and the release cylinder (5) having a primary piston (14) and a secondary piston (16) such that variable spacing between the primary and the secondary pistons (14, 16) compensates for wear of the hydraulically actuatable clutch, and the hydraulic circuit having a pressure reservoir (25) and a pressure-reservoir filling device,
wherein the pressure reservoir (25) is coordinated with a pressure-monitoring/pressure-supply device (28) which determines, in the hydraulic circuit, a reference operating pressure and a differential pressure such that, when the vehicle is at standstill and a motor is shut off, the reference operating pressure is reduced to a static pressure.

2. The hydraulically clutch actuation device according to claim 1, wherein the pressure-monitoring/pressure-supply device (28) has a pressure-limiting unit (30) which facilitates adjustment of the static pressure of hydraulic fluid, located between the primary piston (14) and the secondary piston (16), so as to only allow displacement of the secondary piston (16) of the release cylinder (5) to maintain a contact pressure of the hydraulically actuatable clutch which is sufficient to prevent rolling of the vehicle when at least one of:
the vehicle is at standstill,
a gear is introduced,
a vehicle parking brake is released, and
the vehicle is on an inclined surface.

3. The hydraulically clutch actuation device according to claim 2, wherein indirect parameters are relayed as a standard to the pressure-monitoring/pressure-supply device (28) for establishing a functional dependence of the static pressure based on the corresponding indirect parameters.

4. The hydraulically clutch actuation device according to claim 1, wherein a trigger element (31) is coordinated with the pressure-monitoring/pressure-supply device (28) to revise the static pressure over a timed sequence.

5. The hydraulically clutch actuation device according to claim 1, wherein the primary piston (14) and the secondary piston (16) are located in the release cylinder (5) and are separated by a compensation space (26) which has a variable volume.

6. The hydraulically clutch actuation device according to claim 1, wherein the primary piston (14) is displaced by control of a working valve (24) so that a bleeding hole (23), which communicates with the compensation space (26) in the release cylinder (5), is shut.

7. A hydraulically clutch actuation device for increasing a functional reliability for a hydraulic circuit of a hydraulically actuatable clutch which has a release cylinder (5) containing a primary piston (14) and an axially aligned secondary piston (16), the release cylinder (5) is actuated by a master cylinder (3) via hydraulic pipes (6, 7), and the primary piston (14) and the secondary piston (16) have a variable spacing for compensating for wear of the hydraulically actuatable clutch, and the hydraulically clutch actuation device including a pressure reservoir (25) and a pressure-reservoir filling device, wherein the pressure reservoir (25) is coordinated with one pressure-monitoring/pressure-supply device (28) and a pressure control unit (30) which acts upon a shifting element (24) for displacing the primary piston (14) to a position at which a change in a volume of a compensation space (26), which is coaxially aligned and formed between the primary piston (14) and the secondary piston (16), is prevented, and the pressure control unit (30) is deactivated, at certain time intervals via a trigger switch (31), such that the wear of the hydraulically actuatable clutch is compensated by changing the volume of the compensation space (26).

8. The hydraulically clutch actuation device according to claim 7, wherein a spring (18) directly couples the primary piston (14) to the secondary piston (16) and the spring (18) applies a force which spaces the primary piston (14) from the secondary piston (16).

9. The hydraulically clutch actuation device according to claim 8, wherein the pressure-monitoring/pressure-supply device (28) determines, in the hydraulic circuit, a reference operating pressure and a differential pressure such that, when the vehicle is at a standstill and a motor is shut off, a reference operating pressure of the hydraulic circuit is reduced to a static pressure.

\* \* \* \* \*